United States Patent [19]

Eiserman et al.

[11] 4,221,424
[45] Sep. 9, 1980

[54] MOTOR VEHICLE SLEEPER

[75] Inventors: Martin A. Eiserman, 159 Downing, Buffalo Grove, Ill. 60090; Douglas L. Huffer, New Buffalo, Mich.

[73] Assignee: Martin A. Eiserman, Buffalo Grove, Ill.

[21] Appl. No.: 10,944

[22] Filed: Feb. 9, 1979

[51] Int. Cl.² .................. B62D 27/00; A45F 3/24
[52] U.S. Cl. .................... 296/146; 296/190; 296/24 R; 5/118; 5/120; 5/128
[58] Field of Search .............. 296/190, 146, 24 R; 5/118, 119, 120, 127, 128, 129, 130

[56] References Cited
U.S. PATENT DOCUMENTS

| | | | |
|---|---|---|---|
| 384,728 | 6/1888 | Thomas | 5/123 |
| 1,389,073 | 8/1921 | Schlosser | 5/118 |
| 1,527,989 | 3/1925 | Messing | 5/118 |
| 1,872,740 | 8/1932 | James | 5/118 |
| 2,569,596 | 10/1951 | Anderegg | 5/127 |
| 3,276,512 | 10/1966 | Gallagher | 160/368 |
| 3,454,968 | 7/1969 | Beckman | 5/94 |
| 3,524,673 | 8/1970 | Cramer | 5/118 |
| 3,550,166 | 12/1970 | Kotler | 5/122 |
| 3,588,168 | 6/1971 | Froitzheim | 296/190 |
| 3,612,599 | 10/1971 | Sternberg | 296/190 |

Primary Examiner—Robert R. Song
Attorney, Agent, or Firm—Gerlach & O'Brien

[57] ABSTRACT

A hammock-like portable and collapsible sleeper for use in a motor vehicle having a passenger compartment with doors on opposite sides thereof, which sleeper is adapted to be suspended between the doors and above the seating area in the compartment, includes a fabric body for supporting the user, a stop member adjacent to each of opposite ends of the sleeper body, flexible connecting means interconnecting each of the stop members and the sleeper body and being sufficiently thin for interposition between the tops of the doors and the vehicle body with the doors closed tightly, and means for adjusting the length of the sleeper measured between the stop members. The sleeper is mounted for use with the connecting means interposed between the doors and the body of the vehicle and with the stop members abutting against the outside of the vehicle at the joints between the doors and the vehicle body for supporting the sleeper body in the compartment.

13 Claims, 7 Drawing Figures

MOTOR VEHICLE SLEEPER

BACKGROUND OF THE INVENTION

This invention relates to a motor vehicle sleeper, more particularly, to a hammock-like portable and collapsible sleeper for use in a motor vehicle having a passenger compartment with doors on opposite sides thereof, the sleeper being adapted to be suspended between the doors and above the seating area in the compartment. The sleeper is especially advantageous for use in trucks employed in long distance hauling, including tractor trailer trucks, and also in recreational vehicles and pickup trucks.

Many of the trucks employed for long distance hauling, including tractor trailer trucks, are not equipped with a sleeper for the driver. Consequently, it is often necessary for the driver to sleep over the wheel or in another awkward and uncomfortable position in the cab with the truck pulled off of the road. Owing to the presence in the cab of the steering wheel, control levers, and possibly other equipment, such as a heater housing, and the use of dual seats rather than a bench seat, it is very difficult if possible to obtain the rest a driver should have before proceeding on his way. There is, therefore, a considerable need for a means of obtaining a good rest in the cab of a truck which is not equipped with a built-in sleeper.

SUMMARY OF THE INVENTION

The present invention provides a sleeper which solves the problem of obtaining a suitable rest in the cab of a truck which does not have a built-in sleeper. The sleeper is constructed for use in the passenger compartment of virtually any truck cab, where it may be mounted clear of any obstruction therein, to provide a full-length bed for the driver. The sleeper is mounted very simply, with no need for any special connections and without damage to the parts or finish of the vehicle. The sleeper may be mounted rapidly, so that the driver need waste no time in setting up the sleeper and getting to sleep, and it may be taken down as rapidly. It then is collapsible into a small bundle which is easily and conveniently stored. The sleeper is comfortable and well-ventilated. The length of the sleeper is readily adjusted for use in passenger compartments of various widths, and the length need be set only once for each compartment. The sleeper is simply and economically constructed, so that it may be made readily available to drivers. The foregoing and other advantages of the sleeper make it an attractive accessory for long-haul trucks and also for other vehicles, such as recreational vehicles and small trucks.

The invention in its broader aspects provides a hammock-like portable and collapsible sleeper for use in a motor vehicle having a body encompassing a passenger compartment and doors on opposite sides of and serving to close the compartment, and the combination of the sleeper and the vehicle, such sleeper being adapted to be suspended between the doors and above the seating area in the passenger compartment, and including a fabric body for supporting the user in a reclining position thereon, a stop member, preferably a rod member, adjacent to each of opposite ends of the sleeper body, and flexible connecting means interconnecting each of the stop members and the sleeper body and being sufficiently thin for interposition between the tops of the doors of a vehicle and the vehicle body with the doors closed tightly against the vehicle body. The sleeper preferably also includes means for adjusting the length of the sleeper measured between the stop members, such means preferably including means for adjusting the length of the connecting means between the sleeper body and a stop member. Each connecting means is interposed between a door and the vehicle body with the stop member connected thereto abutting against the outside of the vehicle at the joint between the door and the vehicle body, for supporting the sleeper body in the passenger compartment while in use.

BRIEF DESCRIPTION OF THE DRAWINGS

The attached drawings illustrate preferred embodiments of the invention, without limitation thereto. In the drawings, like elements are identified by like reference symbols in each of the views, and.

DESCRIPTION OF THE PREFERRED EMBODIMENTS

Figure 1:
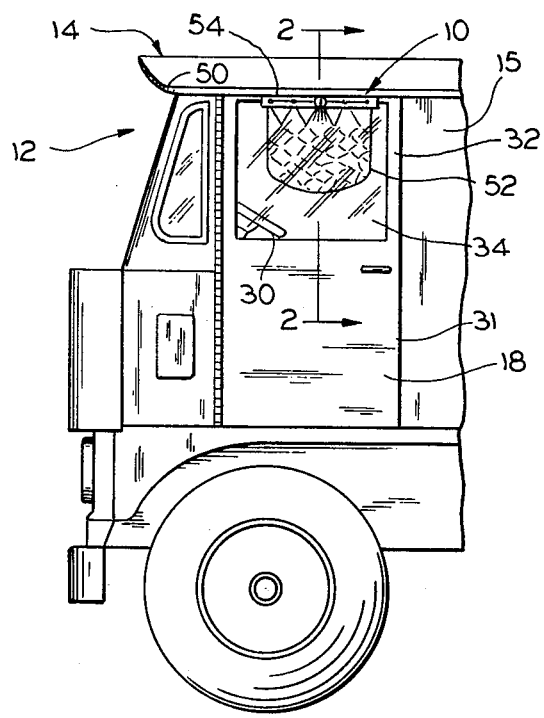
FIG. 1 is a fragmentary side elevational view of a sleeper constituting one embodiment of the invention, employed in a truck cab in accordance with the invention.
Figure 3:
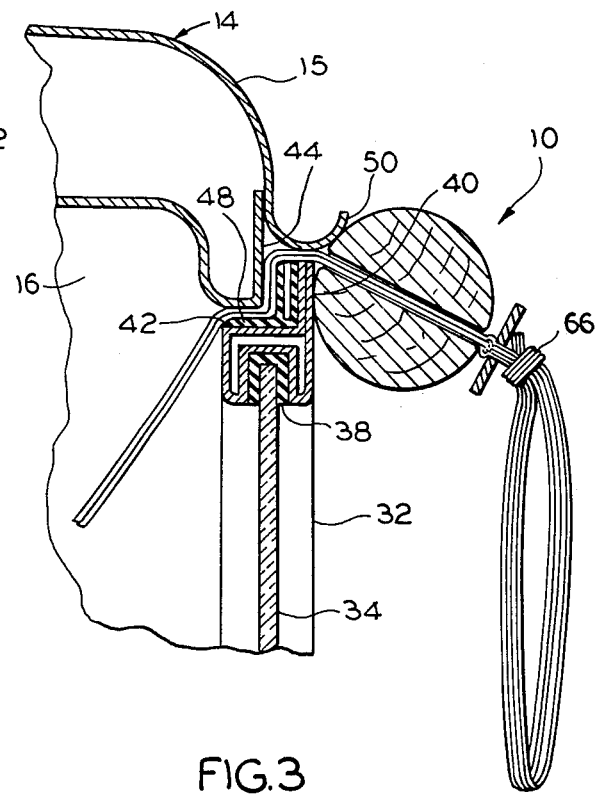
FIG. 3 is a further enlarged detail sectional view, corresponding to a portion of FIG. 2, illustrating the manner in which the sleeper is supported.
Figure 2:
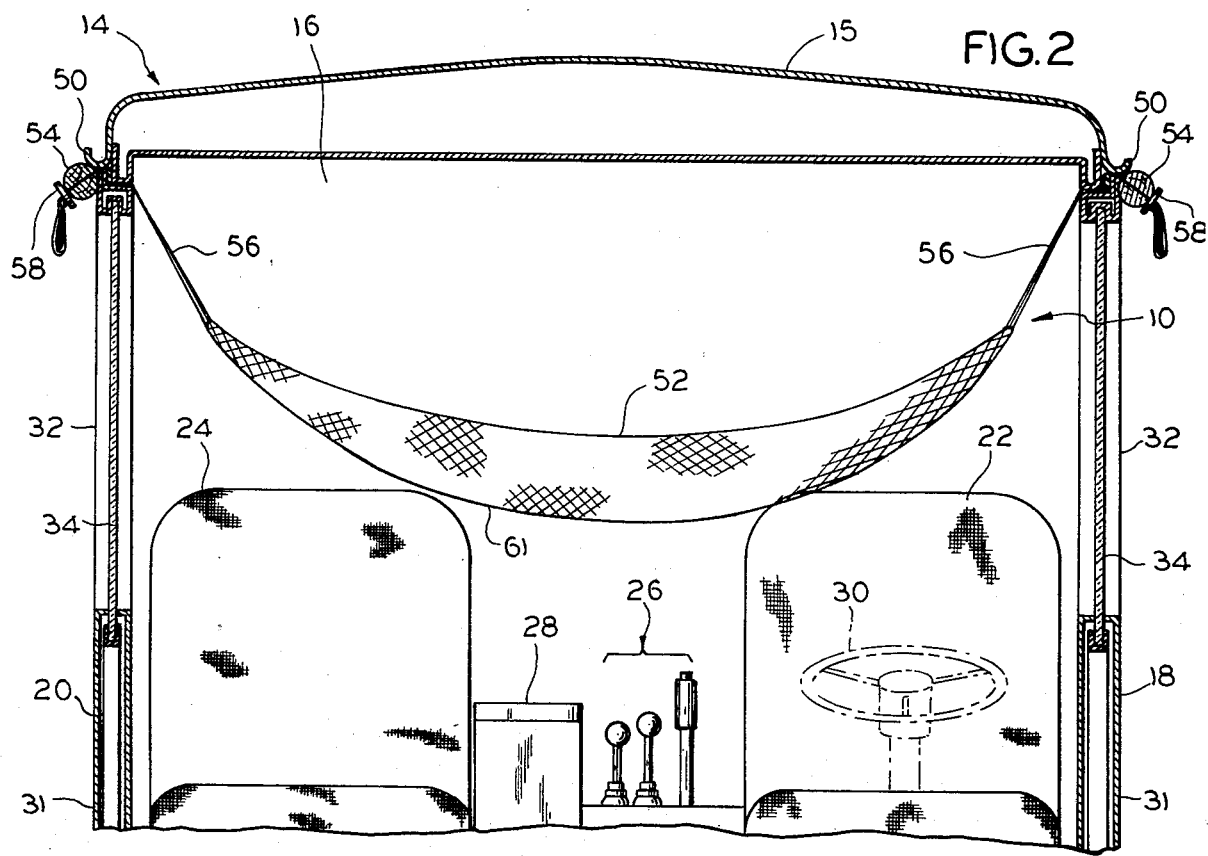
FIG. 2 is an enlarged transverse sectional view of the combination of FIG. 1, taken substantially on line 2—2 thereof.

Referring to the drawings, particularly FIGS. 1–3, a sleeper 10 is employed in combination with a tractor-trailer truck 12 having a turck cab 14, in a preferred embodiment of the invention. The truck 12 has what is termed a "conventional" cab 14, that is, it is not provided with a built-in or permanent sleeper or bunk. Being more economical, the conventional trucks are employed in large numbers, thus creating a substantial need for a portable sleeper adapted for use in a truck cab.

The truck cab 14 has been selected as having structure representative of the structure of various truck cabs, and other cab structures pose similar problems. The cab 14 includes a body 15 encompassing a passenger compartment 16, and doors 18 and 20 on opposite sides of and serving to close the compartment. Dual seats 22 and 24 are provided in the compartment 16, including one seat 22 for the driver and a second seat 24. The seats 22 and 24 are spaced apart a substantial distance, and control levers, generally indicated at 26, extend upwardly from the floor between the seats, such levers including gear shift and brake levers. Other equipment may occupy space in the compartment 16, including a heater box 28. The steering wheel 30 and its column occupy space adjacent to the drivers seat 22.

With such equipment located in various areas in the compartment 16, and because dual seats 22 and 24 are installed, rather than bench seats, the truck driver cannot stretch out in a comfortable position in the truck cab, so as to obtain needed sleep. As will become apparent from the description which follows, the sleeper 10 of the invention solves this problem, inasmuch as it is suspended above the seating area and thereby clear of any obstruction or interference. The sleeper 10 extends between the doors 18 and 20, to utilize the entire width of the truck cab 14 for sleeping room. In its suspended position, the sleeper 10 accommodates the full width of a user's body, without cramping.

The doors 18 and 20, which are generally characteristic of truck doors, include lower metal bodies 31 and upper metal window frames 32. Glass window panes 34 are mounted in the doors 18 and 20, and they may be rolled down into the door bodies 31 and up in the frames 32 into closed sealing engagement with sealing strips 38 in the frames, all in conventional manner. Each window frame 32 terminates in an upwardly projecting flange 40 forming a seat or ledge 42 along the top of each door. The seat 42 is complementary to a horizontal portion 44 of a door frame forming part of the cab body 15. An elastomeric door-sealing strip 48 is mounted on the seat 42, and it extends along the top of the window frame 32 between it and the horizontal door frame portion 44, to provide a seal therebetween when the door is closed tightly. A rain gutter 50 forming part of the cab body 15 extends outwardly beyond the window frames 32 thereabove on opposite sides of the cab 14.

Figure 4:
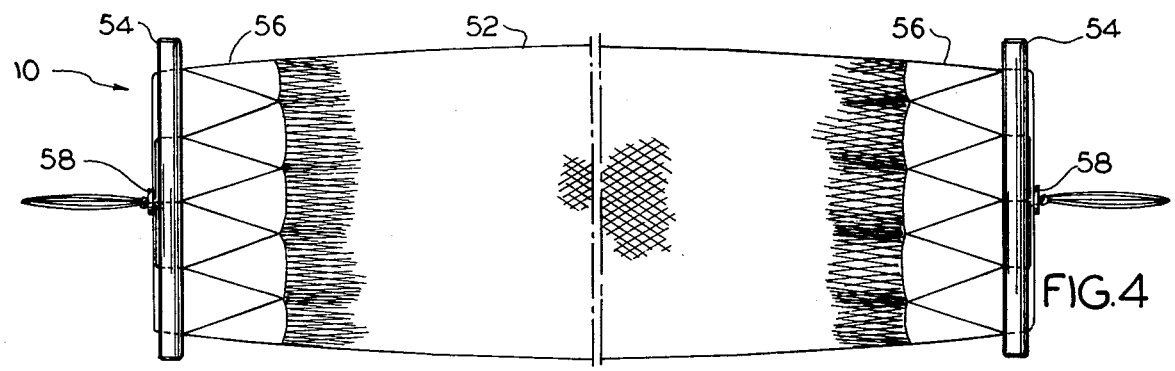
FIG. 4 is a broken plan view of the sleeper, on a smaller scale.
Figure 5:
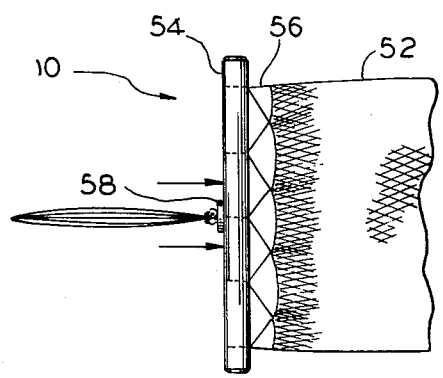
FIG. 5 is a fragmentary view similar to FIG. 4, but illustrating the sleeper adjusted to a shorter length with respect to its condition as illustrated in FIG. 4.
Figure 6:
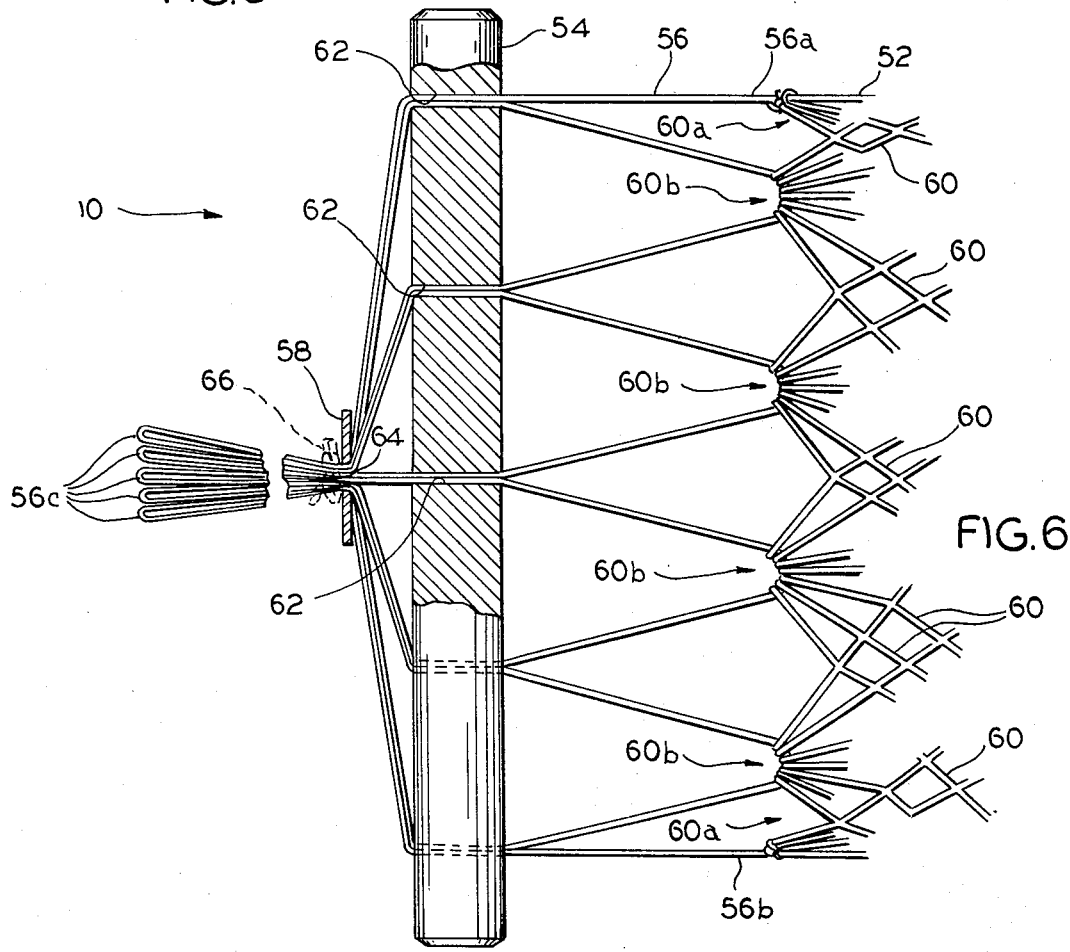
FIG. 6 is an enlarged fragmentary plan view of the sleeper, with parts broken away and in section, showing the details of construction.

Referring to FIGS. 4–6, the sleeper 10 is a hammock-like portable and collapsible structure which includes an elongated fabric body 52, a rod or stop member 54 adjacent to each of opposite ends of the body 52, a flexible cord 56 constituting connecting means which interconnects each of the rod members 54 and the body 52, and a washer-like collecting ring 58 associated with each of the cords 56. The sleeper 10 is adjustable in length, as measured between the rod members 54, and, in particular, the extent of each cord 56 between the body 52 and the rod member 54 connected thereby is adjustable, by means described hereinafter.

In the preferred embodiment of the invention, the sleeper body is formed of a mesh fabric, as illustrated for the body 52 in FIGS. 1–6. The sleeper body 52 when completely extended is rectangular and has square or rectangular meshes 60 (FIG. 6). It is wide enough to enclose and support the body of a user in extended reclining position, with the body held in a pocket 61 (FIG. 2) shaped as in a hammock. The mesh fabric body 52 preferably is formed of relatively fine, lightweight strands of synthetic material, such as nylon, or other suitable material, in a conventional manner. Such material is airy and comfortable, and occupies little space in storage.

Referring particularly to FIG. 6, the rod members 54 are identical, and each is round, preferably cylindrical. Each rod member 54 has a plurality of equidistantly spaced parallel adjustment holes 62 extending therethrough. The diameter of the holes 62 is such as to accommodate a double thickness of a cord 56 with the cord extending freely or loosely therethrough. Each rod member 54 is spaced from the sleeper body 52 and extends transversely thereof.

The cord 56 at each end of the body 52 in the illustrative embodiment is a single cord serving to interconnect the sleeper body 52 and a rod member 54. Each cord extends alternately through an adjustment hole 62 in a rod member 54, and several of the inner meshes 60 of the sleeper body 52, which are in mesh groups 60b at spaced points across the sleeper body 52, staggered or offset with respect to the adjustment holes 62. The opposite ends 56a and 56b of the cord are tied to the meshes in groups 60a adjacent to the side margins of the sleeper body. In the specific illustrative method of interconnecting the rod members 54 and the sleeper body 52, a series of cord loops 56c, equal in number to the number of adjustment holes 62 in a rod member 54, is formed in each cord 56, between the mesh groups 60a and 60b. Successive cord loops 56c are passed through respective adjustment holes 62 in a rod member 54. All of the cord loops 56c are passed through a circular hole 64 in the center of the collecting ring 58, on the outer side of the rod member 54. The collected loops 56c may be knotted together, as illustrated by the knot 66 (see FIGS. 3 and 6).

With the cords 56 connected in the foregoing manner, each rod member 54 is movable on its cord, towards and away from the sleeper body 52, for adjusting the length of the sleeper 10 measured between the rod members. At about the same time, the collecting rings 58 are moved in the same direction as the rod members, for adjusting the limits of outward movement of the rod members. When the desired length of the sleeper 10 is obtained, the outer limits of movement of the rod members 54 and thus the length of the sleeper are fixed by knotting the cord loops 56c to form the knots 66 adjacent to the collecting rings 58, to prevent further outward movement thereof.

FIG. 5 illustrates an adjustment with the rod members 56 relatively close to the body 52, for a relatively short length of the sleeper 10, as compared to the adjustments of FIGS. 4 and 6, which provide relatively long sleeper lengths. The sleeper 10 can be extended still farther in length, the amount of extension depending upon the length of the cords 56. Length adjustment may, alternatively, be made at but one end of the sleeper 10. However, it is preferred to make adjustments at both ends, so that the sleeper body 52 is centered, particularly inasmuch as the adjustment may be made easily and rapidly. In this connection, it will be apparent that the cords 56, or similar cords, may be passed or threaded through the meshes 60 and the adjustment holes 62 in other, equivalent ways, to achieve the same results.

As illustrated in FIGS. 1–3, the sleeper 10 is mounted between the doors 18 and 20, with the rod members 54 at opposite ends of the sleeper arranged on the outside of the cab 14, and the sleeper body 52 supported in the passenger compartment 16 above the seating area. The cords 56 are sufficiently thin for interposition of each cord between the top of one of the doors 18 and 20 and the cab body 15 with the doors closed tightly. More particularly, the cords 56 are interposed between the tops of the window frames 32, and the horizontal door frame portions 44 and the rain gutter 50. The cords 56 are accommodated by the resilient door-sealing strips 48, which compress to receive the cords between them and the door frame portions 44 with the doors 18 and 20 closed tightly.

The rod members 54 are pulled up against the cab body 15, and each rod member extends substantially horizontally and in substantially parallel relation to the adjacent side of the cab body. The rod members abut against the outside of the cab body along the joints between the body and the doors 18 and 20. The rod members 54 may assume the abutting positions when the doors are closed, or thereafter, by applying a force or the weight of the user's body to the sleeper body 52, which pulls on the cords 56 to pull the rod members against the cab body. The pulling of the rod members 54 into complete engagement with the cab body 15 along their length is facilitated by the round contour of the rod members. When an individual is supported on the sleeper body 52, his weight is distributed along the rod members 54, and the load resulting from the inward pulling forces thereon is transferred to the window frames 32 and the gutter 50. In view of the loads involved, it is preferable to support the sleeper 10 from the vehicle doors that are constructed with window frames which engage the rod members 54 and thereby serve as the base of support for the sleeper, rather than from window panes.

The sleeper body 52 is suspended above the seating area and clear of the control levers 26, the heater box 28, the steering wheel 30, and any other accessories. The user climbs into the pocket 61 formed in the sleeper body 52, where he may stretch out for good rest. The doors 18 and 20 may be kept locked with the window panes 34 rolled up, for maximum security and protection against the elements. Alternatively, the window panes 34 may be rolled down to admit air. The mesh fabric form of the sleeper body 52 affords good cooling and ventilation, which is especially desirable in the warm months. After resting, the user may take the sleeper 10 down by opening the doors 18 and 20, and the sleeper may be rolled up into a small, compact bundle for storage. Should the user wish to change the length of the sleeper 10, as in changing trucks, the knots 66 are removed from the cord loops 56c, and the rod members 54 are moved on the cords 56 towards or away from the sleeper body 52, for correspondingly decreasing or increasing the length of the sleeper. The collecting rings 58 are moved in the same directions as the rod members 54, and the loops 56c are knotted once more to provide the knots 66, thereby fixing the length of the sleeper 10 between the rod members 54.

Figure 7:
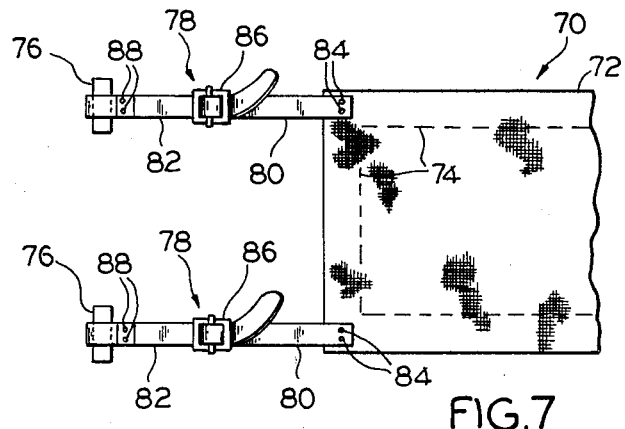
FIG. 7 is a fragmentary plan view of a sleeper constituting an alternative embodiment of the invention.

FIG. 7 illustrates a sleeper 70 constituting a second embodiment of the invention. The sleeper 70 includes a canvas body 72 in rectangular sheet form, having a hem 74 formed around the sheet along each of its margins. At each end of the sleeper body 72, a pair of short cylindrical rod or stop members 76 is connected to the body by a pair of spaced parallel adjustable strap-type connecting means 78. Each connecting means 78 includes a mounting strap 80 and an adjustment strap 82, which are formed of webbing or other suitable material. The inner end of each mounting strap 80 is fixed to the hem 74 of the sleeper body 72 by rivets 84 or other suitable fastening means. A belt buckle 86 is secured to the outer end of each mounting strap 80. The outer end of each adjustment strap 82 is looped over a rod member 76 and fastened to itself by rivets 88 or other suitable fastening means. The inner end of the adjustment strap 82 is inserted through the buckle 86, and the position of the adjustment strap in the buckle may be adjusted to vary the distance between the rod member 76 held thereby, and the sleeper body 72. In this manner, the length of the sleeper 70 measured between the rod members 76 adjacent to opposite ends of the sleeper body may be adjusted.

The sleeper 70 is mounted in the truck cab 14 similarly to the sleeper 10 in the preceding embodiment. Thus, the adjustment straps 82 are interposed between the window frames 32 and the cab body 15 at the tops of the doors 18 and 20, and the rod members 76 abut against the window frames and the gutter 50 along the joints between the doors and the cab body. The adjustment straps 82 and their fastening means are relatively thin, so that they may be mounted in such manner with the doors closed tightly, with particular reference to the thickness which can be accommodated by truck doors.

While preferred embodiments of the invention have been illustrated and described, it will be apparent that changes and modifications may be made therein within the spirit and scope of the invention. It is intended that all such changes and modifications be included within the scope of the appended claims.

We claim:

1. In combination with a motor vehicle having a body encompassing a passenger compartment and doors on opposite sides of and serving to close the compartment, a hammock-like portable and collapsible sleeper adapted to be suspended between said doors and above the seating area in said compartment, said sleeper comprising:
    a fabric body for supporting the user in a reclining position thereon,
    a stop member adjacent to each of opposite ends of said sleeper body, and
    flexible connecting means interconnecting each of said stop members and said sleeper body and being sufficiently thin for interposition between the tops of said doors and the vehicle body with the doors closed tightly against the vehicle body,
    said connecting means being interposed in said manner between respective doors and the vehicle body with said stop members abutting against the outside of the vehicle at the joints between the doors and the vehicle body for supporting said sleeper body in said compartment while in use.

2. A combination as defined in claim 1 and including means for adjusting the length of the sleeper measured between said stop members.

3. A combination as defined in claim 2 and wherein the length of said connecting means between said sleeper body and a stop member is adjustable for adjusting the sleeper length.

4. A combination as defined in claim 1 and wherein each of said stop members is a rod member extending substantially horizontally and in substantially parallel relation to the adjacent side of the vehicle.

5. A combination as defined in claim 4 and wherein at least one of said rod members is provided with a plurality of holes extending transversely therethrough, and said connecting means includes a flexible cord extending through said holes with the rod member movable on the cord towards and away from said sleeper body for adjusting the length of the sleeper measured between said stop members.

6. In combination with a motor vehicle having a body encompassing a passenger compartment and doors on opposite sides of and serving to close the compartment, a hammock-like portable and collapsible sleeper adapted to be suspended between said doors above the seating area in said compartment, said sleeper comprising:
    a fabric body for supporting the user in a reclining position thereon,
    a rod member adjacent to each of opposite ends of said sleeper body and extending transversely thereof, said rod members each having a plurality of holes extending therethrough at spaced points therealong, and a flexible cord interconnecting each of said rod members and said sleeper body and being sufficiently thin for interposition between the tops of said doors and the vehicle body with the doors closed tightly against the vehicle body, said cords each extending through said holes of the rod member to which the cord is connected, thereby spreading the sleeper body, said rod members each being movable on the cord connected thereto towards and away from said sleeper body for adjusting the length of the sleeper measured between the rod members, and said cords being interposed in said manner between respective doors and the vehicle body with said rod members abutting against the outside of the vehicle along the joints between the doors and the vehicle body for supporting said sleeper body in said compartment while in use.

7. A combination as defined in claim 6 and wherein said sleeper body is formed of a mesh fabric, and said cords extend through the meshes of said sleeper body at spaced points thereacross.

8. A combination as defined in claim 6 and including a collecting ring associated with each of said cords on the outer side of the rod member connected to the cord, portions of each cord which extend from the rod member connected thereto being collected and inserted through said ring, said rings being movable on said cord portions towards and away from said sleeper body for adjusting the limits of outward movement of said rod members.

9. A hammock-like portable and collapsible sleeper for use in a motor vehicle having a body encompassing a passenger compartment and doors on opposite sides of and serving to close the compartment, said sleeper being adapted to be suspended between said doors and above the seating area in said compartment, and comprising:

a fabric body for supporting the user in a reclining position thereon, a rod member adjacent to each of opposite ends of said sleeper body and extending transversely thereof, flexible connecting means interconnecting each of said rod members and said sleeper body and being sufficiently thin for interposition between the tops of the doors of a vehicle and the vehicle body with the doors closed tightly, and means for adjusting the length of the sleeper measured between said rod members including means for adjusting the length of said connecting means between said sleeper body and a rod member, whereby said connecting means may be interposed in said manner between respective doors and the vehicle body with said rod members abutting against the outside of the vehicle along the joints between the doors and the vehicle body for supporting said sleeper body in said compartment while in use.

10. A sleeper as defined in claim 9 and wherein at least one of said rod members is provided with a plurality of holes extending transversely therethrough, and said connecting means includes a flexible cord extending through said holes with the rod member movable on the cord towards and away from said sleeper body for adjusting the sleeper length.

11. A hammock-like portable and collapsible sleeper for use in a motor vehicle having a body encompassing a passenger compartment and doors on opposite sides of and serving to close the compartment, said sleeper being adapted to be suspended between said doors and above the seating area in said compartment, and comprising:

a fabric body for supporting the user in a reclining position thereon, a rod member adjacent to each of opposite ends of said sleeper body and extending transversely thereof, said rod members each having a plurality of holes extending therethrough at spaced points therealong, and a flexible cord interconnecting each of said rod members and said sleeper body and being sufficiently thin for interposition between the tops of said doors and the vehicle body with the doors closed tightly, said cords each extending through said holes of the rod member to which it is connected, thereby spreading the sleeper body, said rod members each being movable on the cord connected thereto towards and away from said sleeper body for adjusting the length of the sleeper measured between the rod members, whereby said cords may be interposed in said manner between respective doors and the vehicle body with said rod members abutting against the outside of the vehicle along the joints between the doors and the vehicle body for supporting said sleeper body in said compartment while in use.

12. A sleeper as defined in claim 11 and wherein said sleeper body is formed of a mesh fabric, and said cords extend through the meshes of said sleeper body at spaced points thereacross.

13. A sleeper as defined in claim 12 and including a collecting ring associated with each of said cords on the outer side of the rod member connected to the cord, portions of each cord which extend from the rod member connected thereto being collected and inserted through said ring, said rings being movable on said cord portions towards and away from said sleeper body for adjusting the limits of outward movement of said rod members.

* * * * *